(12) United States Patent
Fleurial et al.

(10) Patent No.: US 8,591,758 B2
(45) Date of Patent: Nov. 26, 2013

(54) MECHANOCHEMICAL SYNTHESIS AND THERMOELECTRIC PROPERTIES OF MAGNESIUM SILICIDE AND RELATED ALLOYS

(75) Inventors: Jean-Pierre Fleurial, Altadena, CA (US); Sabah K. Bux, Chino Hills, CA (US); Richard B. Kaner, Pacific Palisades, CA (US)

(73) Assignee: California Institute of Technology, Pasadena, CA (US)

( * ) Notice: Subject to any disclaimer, the term of this patent is extended or adjusted under 35 U.S.C. 154(b) by 191 days.

(21) Appl. No.: 13/156,033

(22) Filed: Jun. 8, 2011

(65) Prior Publication Data

US 2012/0138843 A1 Jun. 7, 2012

Related U.S. Application Data

(60) Provisional application No. 61/357,928, filed on Jun. 23, 2010.

(51) Int. Cl.
*C01B 33/06* (2006.01)
*C01G 17/00* (2006.01)
*C01G 19/00* (2006.01)

(52) U.S. Cl.
USPC ....... 252/62.3 T; 423/344; 136/239; 136/240; 419/61

(58) Field of Classification Search
USPC .............. 423/344; 252/62.3 T; 136/239, 240; 419/61
See application file for complete search history.

(56) References Cited

U.S. PATENT DOCUMENTS

2008/0023070 A1 1/2008 Sinha
2011/0318250 A1 12/2011 Kaner et al.

FOREIGN PATENT DOCUMENTS

WO 2008/034578 A1 3/2008

OTHER PUBLICATIONS

Boukai, et al., "Silicon nanowires as efficient thermoelectric materials," *Nature*, vol. 451(7175), pp. 168-171 (2008).

Bux, et al., "Nanostructured Bulk Silicon as an Effective Thermoelectric Material," *Adv. Funct. Mater.*, vol. 19(15), pp. 2445-2452 (2009).
Bux, et al., "Rapid Solid State Synthesis of Nanostructured Silicon," *Chem. Mater.*, vol. 22, pp. 2534-2540 Published online Mar. 16, 2010.
Gillan, et al., "Synthesis of Refractory Ceramics via Rapid Metathesis Reactions between Solid-State Precursors," *Chem Mater.*, vol. 8, pp. 333-343 (1996).
Hochbaum, et al., "Enhanced thermoelectric performance of rough silicon nanowires," *Nature*, vol. 451(7175), pp. 163-167 (2008).
Hick, et al., "Mechanochemical Synthesis of Alkaline Earth Carbides and Intercalation Compounds," *Inorg Chem.*, vol. 48, pp. 2333-2338 (2009).
Liu, et al., "A new synthetic routhe for the synthesis of hydrogen terminated silicon nanoparticles," *Materials Science and Engineering B96*, pp. 72-75 (2002).
Neiner, et al., "Low-Temperature Solution Route to Macroscopic Amounts of Hydrogen Terminated Silicon Nanoparticles," *J. Am. Chem. Soc.*, vol. 128, pp. 11016-11017 (2006).
Werwa, et al., "Synthesis and processing of silicon nanocrystallites using a pulsed laser ablation supersonic expansion method," *Appl. Phys. Lett.*, vol. 64(14), pp. 1821-1823 (1994).
Xu, et al., "Self-organized vertically aligned single-crystal silicon nanostructures with controlled shape and aspect ratio by reactive plasma etching," *Appl. Phys. Lett.*, vol. 95(11), pp. 111505-111513 (2009).
Yang, et al., "Synthesis of Alkyl-Terminated Silicon Nanoclusters by a Solution Route," *J. Am. Chem. Soc.*, vol. 121, pp. 5191-5195 (1999).
Zhang, et al, "Synthesis of Ordered Single Crystal Silicon Nanowire Arrays," *Adv. Mater.*, vol. 13(16), pp. 1238-1241 (2001).

*Primary Examiner* — Carol M Koslow
(74) *Attorney, Agent, or Firm* — Kilpatrick Townsend & Stockton LLP.

(57) ABSTRACT

The present invention provides a method of making a substantially phase pure compound including a cation and an anion. The compound is made by mixing in a ball-milling device a first amount of the anion with a first amount of the cation that is less than the stoichiometric amount of the cation, so that substantially all of the first amount of the cation is consumed. The compound is further made by mixing in a ball-milling device a second amount of the cation that is less than the stoichiometric amount of the cation with the mixture remaining in the device. The mixing is continued until substantially all of the second amount of the cation and any unreacted portion of anion X are consumed to afford the substantially phase pure compound.

18 Claims, 7 Drawing Sheets

MECHANOCHEMICAL SYNTHESIS AND THERMOELECTRIC PROPERTIES OF MAGNESIUM SILICIDE AND RELATED ALLOYS

CROSS-REFERENCES TO RELATED APPLICATIONS

This Application claims the benefit of priority to U.S. Application No. 61/357,928, filed Jun. 23, 2010, incorporated in its entirety herein.

STATEMENT AS TO RIGHTS TO INVENTIONS MADE UNDER FEDERALLY SPONSORED RESEARCH OR DEVELOPMENT

The invention described herein was made in the performance of work under a NASA contract, and is subject to the provisions of Public Law 96-517 (35 USC §202) in which the Contractor has elected to retain title.

BACKGROUND OF THE INVENTION

Thermoelectric based generators have been used successfully and reliably for the past 40 years to power deep space probes. These solid-state devices rely only on a temperature gradient to produce electricity, and are thus an attractive way of reducing our demand on fossil fuels. A relatively new application of thermoelectrics is in the area of automobile waste heat recovery. In a typical car, only 25% of the gasoline that is combusted is actually used to move and power the car, while the rest is lost as heat. If some of that heat were recaptured and stored, it would increase the fuel economy of automobiles, and reduce the overall demand for fossil fuels.

Currently, thermoelectric devices have been used only in niche applications such as space craft power generation. In order for them to be attractive for such a large-scale application, the thermal-to-electric conversion efficiency must be increased. Additionally, due to the significant number of automobiles, materials cost, materials abundance, and toxicity also become concerns with regard to the utilization of these devices.

Magnesium silicide and related alloys are attractive candidates because they are composed of abundant and low-cost elements and are relatively non-toxic when compared to their state-of-the-art counterparts, PbTe and $CoSb_3$, which operate in the same mid-temperature range (400 K to 800 K). The family of magnesium IV compounds, including $Mg_2Si$ and $Mg_2Sn$ and their alloys, crystallize in the antifluorite structure with Si in face centered cubic positions and Mg in tetrahedral sites. They have been studied as potential thermoelectric materials in the mid- to high-temperature range for the past sixty years. It is theorized that these compounds can achieve high zT values due to their large effective masses, high mobilities, and relatively low lattice thermal conductivities.

$Mg_2Si$-based compounds are typically synthesized on a small scale via melt synthesis or casting. Scaling up these methods is problematic due to the high vapor pressure and reactivity of magnesium, which can lead to the loss of magnesium and poor control over stoichiometry. Off-stoichiometric material can lead to vacancies and other defects in the crystal structure which affect the extrinsic carrier concentration and carrier mobility. A similar problem was found in the $La_{3-x}Te_4$ system, where high temperature synthesis leads to poor stoichiometric control that can be solved by switching to a mechanochemical synthetic method. Mechanical alloying or high-energy ball-milling can be an attractive technique for producing large-scale quantities of materials that usually require complex synthetic processes at elevated temperatures.

Ball-milling is often performed with materials that are very brittle, and thus respond well to the fracturing and welding that occur in milling. For materials that have a higher malleability, such as magnesium, ball-milling often leaves incomplete product formation, and aggregation of the malleable material, even with extended milling times. Earlier work with this technique generally resulted in incomplete product formation, leaving a significant amount of unreacted elements. Originally, Schiltz and co-workers theorized that the phase pure compound could be made after 1400 hours of continuous operation using an impact mill (M. Riffel and J. Schiltz, Scripta Metallurgica et Materiala, 1995, 32, 1951-1956). In an approach to control the kinetics of ball milling, Li and Kong used a lower impact energy, friction-driven, planetary mill; however, even after 100 hours of milling, they could not synthesize phase pure $Mg_2Si$ (G. H. Li and Q. P. Kong, Scripta Metallurgica et Materialia, 1995, 32, 1435-1440). Niu and co-workers sought to optimize the Li and Kong synthesis by increasing the RPMs of the planetary ball mill, ball-to-powder ratio, and time, yet still could not produce phase pure product after 30 hours of milling (X. Niu and L. Lu, Advanced Performance Materials, 1997, 4, 275-283).

In addition to failing to produce a phase pure product, these groups all reported significant contamination from the milling media during the ball-milling process. In other attempts to obtain a phase pure product, various groups ball-milled the starting materials, then subjected the finely divided powders to thermal treatment either by annealing or sintering via hot-pressing or spark plasma sintering to make phase pure $Mg_2Si$ bulk compacts. However, the problem with the high vapor pressure of Mg remains, and this can lead to catastrophic failure of the annealing vessel or the graphite dies. What is needed is a method of making a substantially phase pure compound comprising an alkali or alkali earth metal and a Group IV element. Surprisingly, the present invention meets this and other needs.

SUMMARY OF THE INVENTION

In one embodiment, the present invention provides a method of making a substantially phase pure compound of Formula I,

AX where A is a cation Na, K, Rb, Mg, Ca, Sr, or Ba, or combinations thereof, and X is an anion Si, Ge, or Sn, or combinations thereof, and where the compound of Formula I is charge neutral. The method includes mixing a stoichiometric amount of anion X and a first amount of cation A in a ball-milling device, where the first amount of cation A is less than a stoichiometric amount of cation A, thereby consuming substantially all of the first amount of cation A and a first portion of anion X that is less than the stoichiometric amount of anion X to form a mixture of AX and unreacted X. The method further includes mixing a second amount of cation A with the unreacted X and the AX in the ball-milling device, where the second amount of cation A is less than the stoichiometric amount of cation A, thereby consuming substantially all of the second amount of cation A and a first amount of unreacted X, to afford substantially phase pure AX.

DETAILED DESCRIPTION OF THE INVENTION

The present invention provides methods for making a substantially phase pure compound. The methods can involve the sequential addition of one of the reactants in less than stoichiometric amounts, such that the one reactant is the rate limiting component. The method can involve multiple additions of the rate limiting component.

I. DEFINITIONS

As used herein, the phrase "substantially phase-pure compound" refers to compounds that have little or no impurities other than those intended to be present in the compound, such as dopants or alloy mixtures. Some examples of impurities are contamination of the compound with oxygen, which can form oxide compounds, as well as contamination from the milling media or container in which the milling is performed. A substantially phase pure compound can contain a nominal atomic composition of the cation and the anion of at least about 95%, more preferably at least about 97%, and even more preferably at least about 98%.

As used herein, the term "mixing" refers to any means of ball-milling that is performed to combine multiple elements. The mixing can create energy that is transferred to the elements that are being mixed, and this energy can enable bonding between the elements. The mixing can completely blend the elements, or in some aspects only partially blend the elements.

As used herein, the term "ball-milling" refers to a type of mixing in which the materials to be mixed are ground in a device with a milling media to facilitate the grinding. The milling media can be any material that can freely move about the device and contact the materials to be mixed. The ball-milling device can include at least one moveable portion, often a container, that moves below a critical speed to effect movement of the milling media, which then contacts the materials and grinds them. This grinding can include both reducing the particles in size, as well as fracturing the materials, and cold-welding the materials in the device to create chemical bonds. Some ball-milling devices, termed high-energy ball-milling devices, can include a two-part container system in which an inner drum is asymmetrically coupled to a second drum. Rotation of the larger drum can rotate the inner drum outside of the central axis of the inner drum, which can allow more energy to be transferred to the milling media. This energy can allow the milling media to employ even greater impact forces on the materials to be ground, allowing for smaller particles to be formed, or more uniform bonding to occur.

As used herein, the term "unreacted" refers to a condition in which at least part of one reacting substance fails to react with a second substance. The failure to react can occur due to not having stoichiometrically equivalent portions of the two substances available for reaction, or in other cases because an incomplete reaction has occurred. An unreacted portion of a substance can change certain physical properties such as particle size due to the milling.

As used herein, the phrase "anaerobic environment" refers to an environment with little to no oxygen. This environment can be created in ways that can include creating a vacuum on an environment that removes substantially all or all of the oxygen, or by injecting an inert gas into the environment that forces the oxygen from the environment, or by some combination of the two.

As used herein, the term "densify" refers to the process of applying heat, pressure, or both to a substance to increase its density. Densifying can occur in a vacuum, and can alternatively be called hot pressing.

As used herein, the term "dopant" refers to any element on the periodic table that is purposefully incorporated into the substantially phase pure compound as an impurity to affect the electrical properties of the substantially phase pure compound.

II. METHOD OF MAKING PHASE PURE COMPOUND

In some embodiments, the present invention provides a method for making a substantially phase pure compound. The methods can involve the sequential addition of one of the reactants in less than stoichiometric amounts, such that the one reactant is the rate limiting component. The method can involve multiple additions of the rate limiting component.

In some embodiments, the invention provides a method to make a substantially phase pure compound of Formula I,

AX where A is a cation selected from Na, K, Rb, Mg, Ca, Sr, or Ba, or combinations thereof, and X is an anion selected from Si, Ge, or Sn, or combinations thereof, and where the compound of Formula I is charge neutral. The method also includes mixing a stoichiometric amount of anion X and a first amount of cation A in a ball-milling device, where the first amount of cation A is less than a stoichiometric amount of cation A, thereby consuming substantially all of the first amount of cation A and a first portion of anion X that is less than the stoichiometric amount of anion X to form a mixture of AX and unreacted X. The method further includes mixing a second amount of cation A with the unreacted X and the AX in the ball-milling device, where the second amount of cation A is less than the stoichiometric amount of cation A, thereby consuming substantially all of the second amount of cation A and a first amount of unreacted X, to afford substantially phase pure AX.

In some embodiments, the less than the stoichiometric amount of A is added in equal amounts to the ball-milling device. Alternatively, the amounts of A added can be progressively larger or smaller than the previous amounts. In other embodiments, the less than the stoichiometric amount of A is added as a percent of the stoichiometric amount of A, and can be added as about 75% of the stoichiometric amount of A, or preferably about 50%, 45% 40%, 35%, 33%, 30%, 27%, 25%, 22%, 20%, 17%, 15%, 14%, 13%, 12%, 11%, 10%, 9%, 8%, 7%, 6%, 5%, 4%, 3%, 2%, or about 1% of the stoichiometric amount of A. Each amount of A can be about equal to, greater than, or less than any other amount of A.

In some embodiments, the first amount of unreacted X is substantially all of the remaining X. In other embodiments, the first amount of unreacted X is less than the remaining amount of X. In some embodiments, a third amount of cation A is mixed with any remaining X and the AX in the ball-milling device, wherein the third amount of A is less than the stoichiometric amount of cation A, thereby consuming substantially all of the third amount of cation A and any remaining X, to afford substantially phase pure AX.

In still other embodiments additional mixing can be performed with additional amounts of cation A and any unreacted amounts of X. The total number of additions can be from 2 to about 100 additions, depending on the application scale, and preferably from 2 to about 50, 2 to about 20, or 2 to about 10. In other embodiments, there can be 2, 3, 4, 5, 6, 7, 8, 9, 10, or more additions of cation A wherein each addition or amount of A is less than the stoichiometric amount of cation A. Each amount of cation A can be about an equal amount, a greater amount, or a lesser amount than other amounts of cation. In some embodiments, each amount of cation A is a substantially equivalent amount of cation A.

In order to produce substantially phase pure compounds, the particular substances that are mixed can have high purities. In some embodiments the individual materials can have purities above about 90%, preferably above about 95%, 97%, 98%, 99%, 99.9%, 99.99%, or about 99.999%. Powders of such purity can be obtained from various manufacturers, including Alfa Aesar, A Johnson Matthey Company.

Prior to mixing the second amount of A, the mixture formed after the first mixing step can be analyzed to determine if the less than the stoichiometric amount of A has been substantially consumed. This analyzing can include either visual or process analysis. The visual analysis can include merely viewing the current mixture to determine if the color of the mixture is correct based on the known color of the phase pure compound. Alternatively, analysis can be performed such as X-ray diffraction, wavelength dispersive spectroscopy, scanning electron imaging, transmission electron imaging, or other means as will be appreciated by those skilled in the art.

The substantially phase pure compound produced by the method can have limited contamination from oxygen or other unwanted materials, and can include less than about 10% contamination, preferably less than about 7%, 5%, 4%, 3%, 2%, 1%, 0.5%, 0.1%, or about 0.01% contamination of materials in the AX compound. The amount of contamination can be further limited by utilizing the mixing environment as described below. In some embodiments, the substantially phase pure AX contains less than two percent oxide.

The mixing can occur in any suitable environment. The substantially phase pure compound produced can include little if any unwanted impurity or contamination. Such contamination sources can be oxygen, which produces oxide on the compound, or alternatively can be from the milling device or milling media. In order to limit the amount of contamination from the milling device or milling media, suitably hard devices and media can be utilized, and can be made of iron, steel, stone, ceramics, tungsten carbide, or other materials known to have either none or limited shearing, fracturing, or bonding under the force of impact with the materials being mixed.

Oxide contamination can also prevent the formation of a substantially phase pure compound. Oxygen contamination can be limited by the use of pure constituent materials as described above, and additionally by mixing in a substantially anaerobic environment. The substantially anaerobic environment can be maintained throughout the method by performing the method in an oxygen-free environment. In one embodiment, the anaerobic environment is sustained by maintaining the constituent materials and performing the method within an argon atmosphere. Argon, or any other suitable, non-reacting gas can be used to prevent oxygen from contaminating the produced compound. In some embodiments, the mixing occurs in a substantially anaerobic environment. In other embodiments, the mixing is performed in an argon atmosphere.

Any suitable milling device can be used in the method, and can include planetary mills, ball-mills, high-energy ball mills, mills containing lifting plates or wear plates around the drum, or any other impact or friction based grinding devices as appreciated by one of skill in the art. The milling device and any contained milling media can be made of harder materials that are less likely to contaminate the product being milled. In some embodiments, the ball-milling device is a high-energy ball-milling device.

The milling media used in the milling device can be substantially spherically shaped, and can be of the same or a different material as the device in which the milling occurs. The milling media can be anywhere from about 1 mm to about 25 cm in diameter, depending on the scale of the application, and can preferably be from about 1 mm to about 10 cm, about 1 mm to about 1 cm, about 1 mm to about 50 mm, about 1 mm to about 25 mm, or about 5 mm to about 15 mm. Advantageously, the milling media can work in coordination with the anion, which can act as an additional milling media in some embodiments. While the milling media will maintain substantially the same size and shape throughout the milling, the anion, such as silicon, will continue to reduce in particle size due to the impacts with the milling media. Because the anion can be harder than a more ductile cation, such as magnesium, the anion that is being reduced in size can further reduce the particle size of the cation, because a smaller grinding medium can often produce smaller particles of the product. By creating a situation in which the cation particles can be further reduced in size, the effective surface area of the cation can be enhanced substantially. A greater surface area on smaller particles can reduce the time needed to create the substantially phase pure compound.

The milling media can be chosen based on several factors in order to minimize contamination of the substantially phase pure product. The milling media can include ceramics, steel, rock, tungsten, or other materials that can withstand the impacting that occurs during milling without fracturing. The milling media can additionally be chosen based on the ability to separate it from the final product, such as by magnets, washing, or other means as would be understood by one of skill in the art. Additionally, the media can itself be a densified, compressed, or in another modified or unmodified form of the anion or cation material. For example, in some embodiments, the milling media can comprise silicon in addition to the silicon being used as the cation along with an anion such as magnesium. The silicon milling media can be of a much larger size than the powder being produced such that after milling has been completed, the silicon milling media can be removed from the mixture. The silicon media used can be less likely to contaminate the phase pure compound because the structure of the compound is based on the inclusion of silicon.

The method of the present invention can be performed at any suitable scale, from milligrams to kilograms. In some embodiments, the method is performed using more than 500 grams of material, or about 100, 75, 50, 25, or 10 grams. In other embodiments, the method is performed using less than about 10 grams of material, such as about 9, 8, 7, 6, 5, 4, 3, 2, or 1 gram(s) of material.

The method of the present invention can be performed in any suitable period of time. The time for completion of the method can be dependent on the scale of the method, with larger amounts of material requiring longer periods of time. In some embodiments, the method is completed in less than about 100, 50, 30, 25, 10 or 5 hours. The method of the present invention produces high purity compounds in less time than prior art methods.

In addition to providing a substantially phase pure compound, in some embodiments the method can be used additionally to dope a compound formed by the method. The dopants can include n-type dopants or p-type dopants, and can include Group V or Group VI elements including phosphorus, arsenic, antimony, bismuth, selenium, and tellurium. The dopants can additionally include metalloids including boron, and other materials including Group III elements including aluminum, gallium, indium, and other transition metals including silver, and other metals including lithium. One of skill will appreciate that other dopants can be used as well. Dopants useful in the present invention include the alkali metals, alkali earth metals, transition metals and post-transition metals, as well as rare earth metals. Alkali metals include Li, Na, K, Rb and Cs. Alkaline earth metals include Be, Mg, Ca, Sr and Ba. Transition metals include Sc, Ti, V, Cr, Mn, Fe, Co, Ni, Cu, Zn, Y, Zr, Nb, Mo, Tc, Ru, Rh, Pd, Ag, Cd, La, Hf, Ta, W, Re, Os, Ir, Pt, Au, Hg and Ac. Post-transition metals include Al, Ga, In, Tl, Ge, Sn, Pb, Sb, Bi, and Po. Rare earth metals include La, Ce, Pr, Nd, Sm, Eu, Gd, Tb, Dy, Ho, Er, Tm, Yb, and Lu. One of skill in the art will appreciate that the metals described above can each adopt several different oxidation states, all of which are useful in the present invention. Moreover, the metals and metalloids above can be combined in various combinations to form alloys that are also useful as dopants in the present invention. In some embodiments, the compound AX is doped with a Group V element. In some embodiments, the dopant is bismuth.

The doping can be performed by incorporating a stoichiometric amount of the dopant with the stoichiometric amount of the anion in the milling device. Alternatively, less than the stoichiometric amount of the dopant can be included, and a second amount of the dopant less than the stoichiometric amount can be added with the second addition of the cation. The atomic percent concentration of the dopant in the substantially phase pure compound can be between about 0.001% and about 10%, preferably between about 0.01% and about 5%, about 0.01% and about 3%, or about 0.1% and about 2%. In some embodiments, the dopant concentration in the compound AX is between about 0.001 and 1.5 atomic weight percent of the compound AX.

In some embodiments, the amount of the dopant can be chosen based on a solubility of the dopant to limit the amount of excess dopant that can accumulate at the grain boundaries. In other embodiments, the amount of doping can be chosen to create properties of the compound indicative of extrinsic or degenerate doping. In still other embodiments, the amount of doping can be selected to create compounds with improved thermodynamic efficiency based on a value of merit at particular temperatures within about the operating temperature range of the compound. The amount of doping of the compound can be selected to create compounds with a merit value of about 0.5, or preferably about 0.6, 0.7, 0.8, 0.9, 1.0, 1.1, 1.2, 1.4, 1.6. 1.8, 2.0, or higher.

In some embodiments, the dopant can replace the anion, such as silicon, as a substitutional dopant, and donate one electron into the conduction band for each dopant atom substituted into the compound lattice. Dopants can be chosen based on the relative size of the atoms such that they are unlikely to enter interstitial sites of the lattice. In other embodiments, the dopant can be chosen based on size such that it does not substitute for the cation.

In performing the method as outlined above, using the full stoichiometric amount of the anion at the outset can have additional benefits. Advantageously, in embodiments including constituent elements like magnesium and silicon, the harder silicon powder can act as an additional grinding media along with the milling media. Agglomeration of more ductile cations, such as magnesium, can thus be prevented. This prevented agglomeration can in turn increase the bonding of the magnesium with the silicon due to a greater amount of exposed surface area to afford substantially phase pure product. Moreover, the greater amount of anion can prevent the aggregation of the cation by dilution. In still other embodiments, the anion can also be added to the milling device in an incremental fashion similar to or different from the method previously described for the cation. To realize commercially viable quantities of the phase pure compound, some level of staging the additions of the constituent materials can be performed, as appreciated by one of skill in the art.

In some embodiments, the invention provides a method to make a substantially phase pure compound of Formula I, $$A_2X$$

wherein A is a cation Mg, Ca, Sr, or Ba, and X is an anion Si, Ge, or Sn. In some embodiments, cation A is Mg. In other embodiments, the compound is $Mg_2Si$, $Mg_2Ge$, $Mg_2Sn$, or $Ca_2Si$. In some embodiments, the compound is $Mg_2Si$.

In other embodiments, the invention provides a method of making a substantially phase pure compound of Formula I, where the compound of Formula I is:

$$A^1_2X^1_aX^2_b$$

where $A^1$ is a cation selected from the group including Mg, Ca, Sr and Ba, and $X^1$ and $X^2$ are each independently an anion selected from the group including Si, Ge, and Sn; and subscripts a and b are each independently from 0 to 1, such that the sum of a and b is 1. In other embodiments, the subscripts a and b are each independently greater than 0 and less than 1. In some embodiments, the compound is $Mg_2Si_{1-x}Sn_x$, wherein subscript x is from 0 to 1. In some embodiments, subscript x of compound $Mg_2Si_{1-x}Sn_x$ is greater than 0 and less than 1.

In still other embodiments, the invention provides a method to make a substantially phase pure compound of Formula I, where the compound of Formula I is:

$$A^1_x X^1_a X^2_b X^3_c$$

$$A^1_x X^1_a X^2_b$$

$$A^1_x A^2_y X^1_a X^2_b X^3_c$$

$$A^1_x A^2_y X^1_a X^2_b$$

and $$A^1_x A^2_y X^1_a$$

where $A^1$ and $A^2$ are each a cation independently selected from Na, K, Rb, Mg, Ca, Sr, or Ba; and $X^1$, $X^2$ and $X^3$ are each an anion independently selected from Si, Ge, or Sn. Subscripts a, b and c are each independently from 0 to 1, such that the sum of a, b and c is 1; and subscripts x and y are each independently from 0 to 4, such that the sum of x and y is from 2 to 4. In other embodiments, the subscripts a, b and c, when present, are each independently greater than 0 and less than 1, such that the sum of subscripts a, b and c that are present is 1. In other embodiments, the subscripts x and y, when present, are each independently greater than 0 and less than 4, such that the sum of subscripts x and y that are present is from 2 to 4.

The substantially phase pure compound can include compounds such as, but not limited to, $Mg_2Si$, $Mg_2Ge$, $Mg_2Sn$, $CaSi_2$, or $Ca_2Si$. The compounds can also include alloys such as $Mg_2Si_aSn_b$, $Mg_2Ge_aSn_b$, $Mg_2Si_aGe_bSn_c$, $CaSi_aGe_b$, $Mg_{x-}Ca_ySi_aGe_bSn_c$ where subscripts a, b, and c are each independently from 0 to 1, such that the sum of a, b, and c is 1, and where subscripts x and y are each independently from 0 to 4, such that the sum of x and y is from 2 to 4. In other embodiments, the subscripts a, b and c, when present, are each independently greater than 0 and less than 1, such that the sum of subscripts a, b and c that are present is 1. In other embodiments, the subscripts x and y, when present, are each independently greater than 0 and less than 4, such that the sum of subscripts x and y that are present is from 2 to 4.

Subsequent to the mixing, the substantially phase pure product can be densified. The densification can occur by heating, compressing, sintering, annealing, or a combination such as hot pressing. The heat from the pressing can be in some embodiments over about 100 K, 200 K, 500 K, 750 K, 1000 K, 1500 K, 2000 K, or about 3000 K. The pressure can be greater than about 5 MPa, 10 MPa, 20 MPa, 50 MPa, 75 MPa, 100 MPa, 150 MPa, 200 MPa, or about 500 MPa. Because the method described herein affords a substantially phase pure compound, sintering can be performed despite the high vapor pressure of some cations, such as magnesium, which can explode or otherwise damage a hot press or similar device.

III. EXAMPLES

Example 1

Producing a Substantially Phase Pure $Mg_2Si$

This example provides a method according to the present invention of producing a substantially phase pure compound of $Mg_2Si$.

Unfunctionalized n-type $Mg_2Si$ powders were prepared by high-energy ball milling of 325 mesh Si powder (99.999%), Mg turnings (99.8%) and Bi shot (99.999%) (all from Alfa Aesar) in an argon atmosphere. Stoichiometric amounts of the Si powder and Bi shot were added to a 55 mL tungsten carbide vial (Spex CertiPrep) using 12 mm tungsten carbide ball bearings. A stochiometric amount of Mg turnings were added in 200-500 mg increments and milled for intervals of one hour or less using a Spex CertiPrep 8000 series mill at its fixed RPM. The reaction was conducted on a 4-10 gram scale. Once all of the Mg had been incorporated into the milling vial and milled, the phase pure $Mg_2Si$ product was then loaded into 12 mm graphite dies (POCO) in an argon-filled glove box and then transferred to a uniaxial hot-press. Each sample was then hot-pressed at temperature in excess of 1000 K and pressures of at least 100 MPa for 1 hour under argon and vacuum. The geometric density of the densified cylinders (approximately 1 cm in height) were measured to be greater than 99% of the theoretical density.

The thermoelectric transport properties were measured on full sized hot-pressed pellets as well as on thin 1 mm slices cut from each pellet. Transport property measurements were conducted as a function of temperature under high vacuum using both commercial and custom-made set-ups described elsewhere. The temperature was limited to 775 K to prevent sublimation of the samples during measurements, a well known issue for $Mg_2Si$. The properties measured included electrical resistivity, Hall coefficient and Seebeck coefficient, as well as thermal diffusivity, all of which were measured using a heating rate of 180 K/hr. Thermal diffusivity was measured using a Netzch laser flash diffusivity system from room temperature to 775 K. The thermal conductivity was calculated using the relation $\kappa = \alpha * Cp * \rho$, where $\alpha$ is the measured thermal diffusivity, Cp is the specific heat capacity, and $\rho$ is the measured geometric density.

Example 2

Production of $Mg_2Ge$

Figure 1:
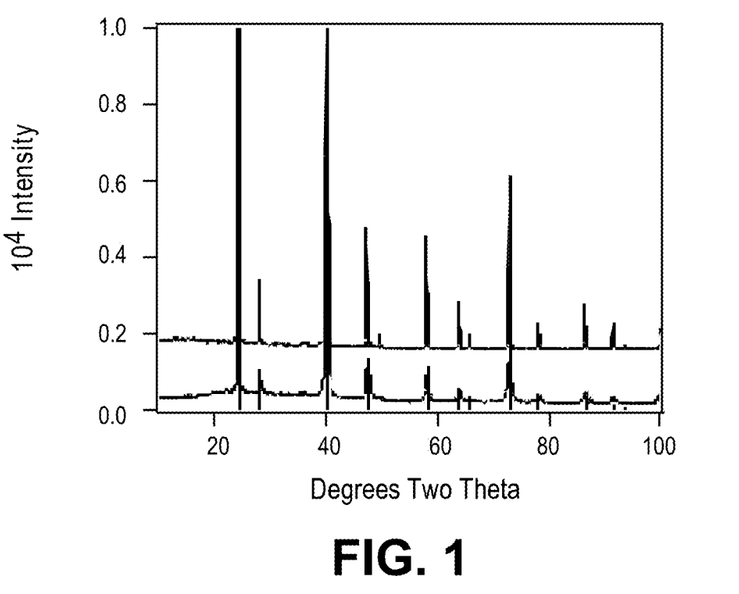
FIG. 1 shows a powder X-ray diffraction pattern of a 0.5% Bi doped sample of phase pure $Mg_2Si$ made according to an embodiment of the present invention.
Figure 2:
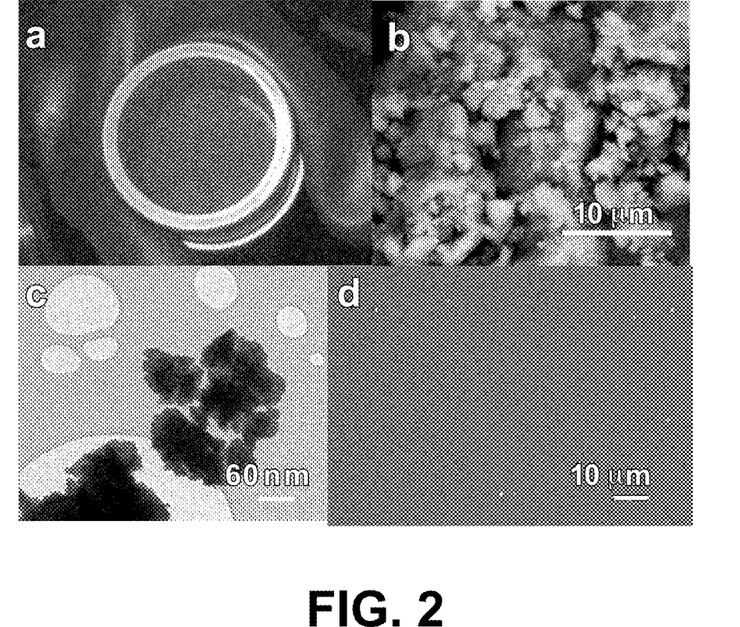
FIG. 2a shows an Mg$_2$Si compound made according to an embodiment of the present invention.
FIG. 2b shows an SEM image of Mg$_2$Si particles made according to an embodiment of the present invention.
FIG. 2c shows a TEM image of Mg$_2$Si aggregates made according to an embodiment of the present invention.
FIG. 2d shows a backscattered electron image of a substantially phase pure compound made according to an embodiment of the present invention.
Figure 3:
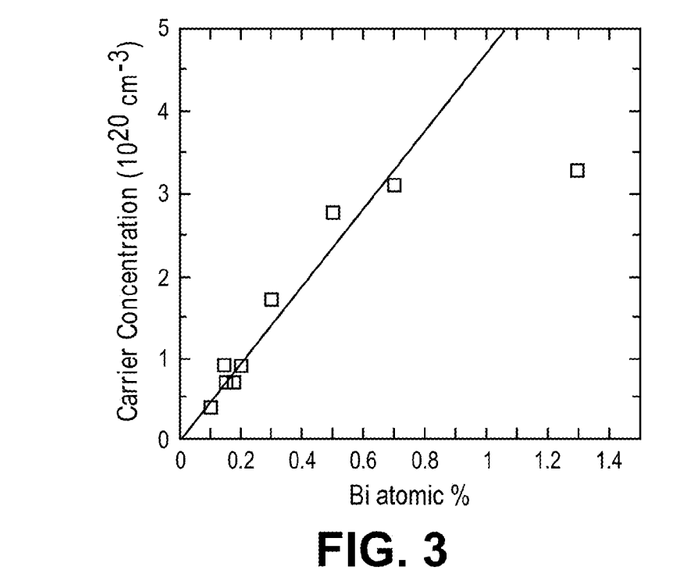
FIG. 3 shows a graph of carrier concentration as a function of bismuth doping level in an Mg$_2$Si compound made according to embodiments of the present invention.
Figure 4:
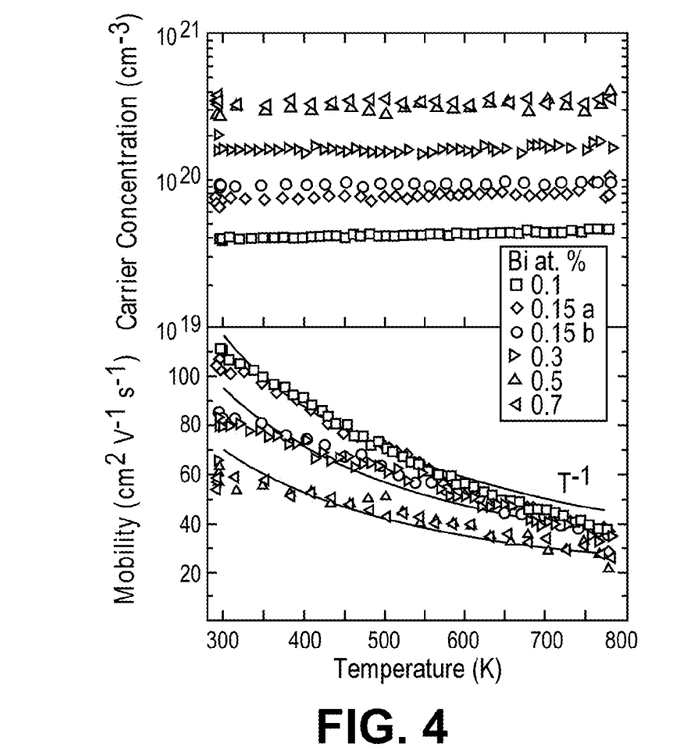
FIG. 4 shows a graph of mobility and carrier concentration as a function of temperature for various bismuth doping levels in an Mg$_2$Si compound made according to embodiments of the present invention.
Figure 5:
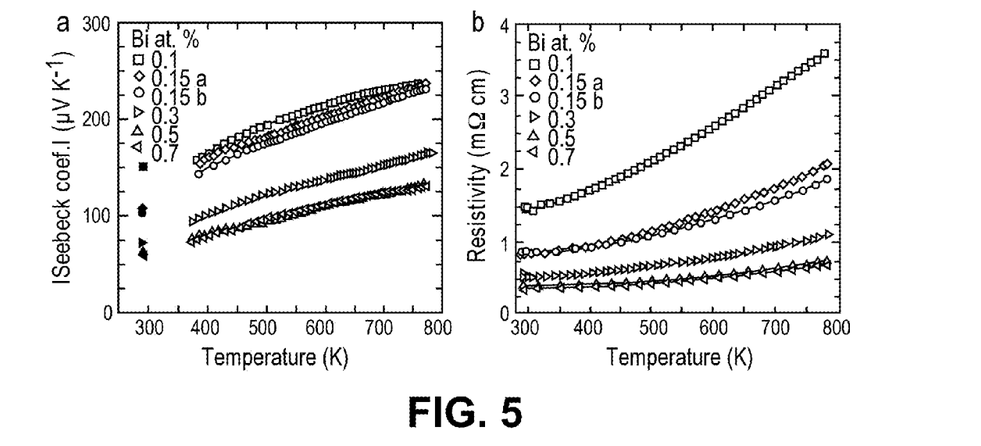
FIG. 5a shows a graph of the Seebeck coefficient as a function of temperature for various bismuth doping levels in an Mg$_2$Si compound made according to embodiments of the present invention.
FIG. 5b shows a graph of the electrical resistivity as a function of temperature for various bismuth doping levels in an Mg$_2$Si compound made according to embodiments of the present invention.
Figure 6:
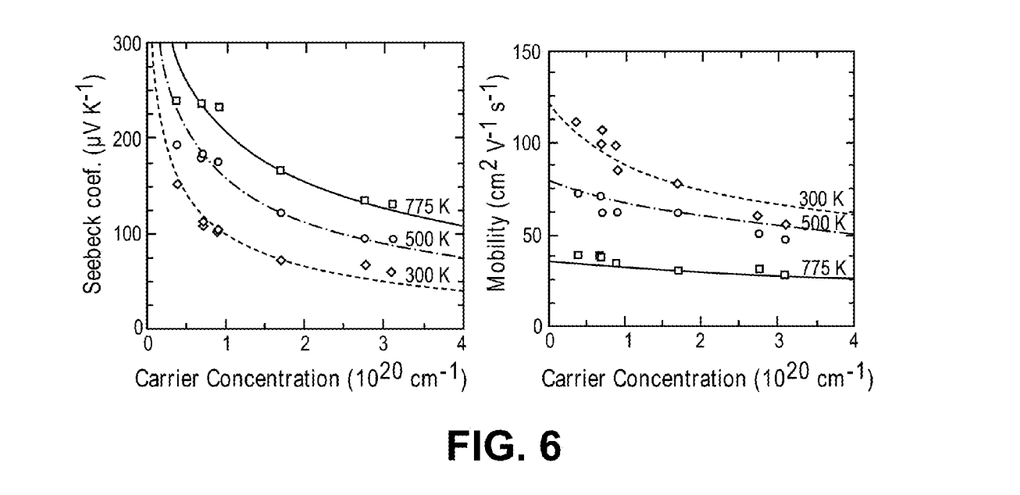
FIG. 6 shows a graph of the Seebeck coefficient and the mobility as a function of the carrier concentration for various bismuth doping levels in an Mg$_2$Si compound made according to embodiments of the present invention.
Figure 7:
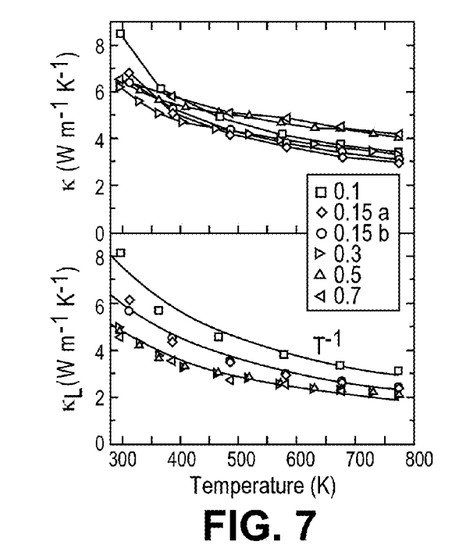
FIG. 7 shows a graph of thermal conductivity and the lattice component of thermal conductivity as a function of temperature for various bismuth doping levels in an Mg$_2$Si compound made according to embodiments of the present invention.
Figure 8:
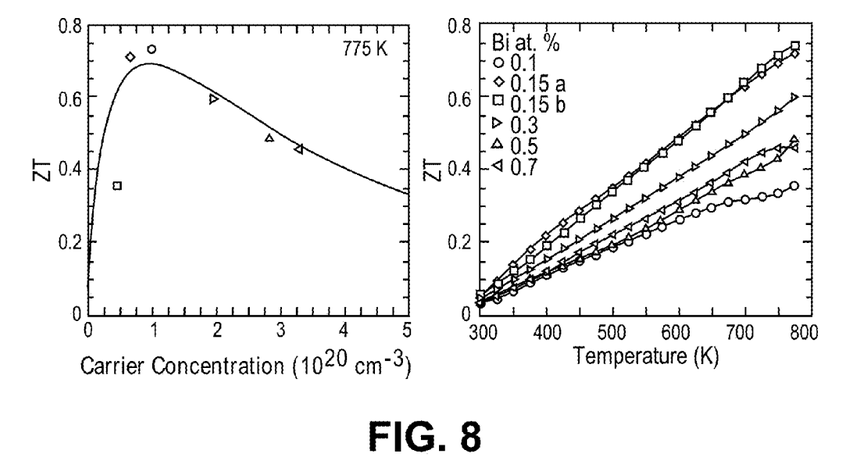
FIG. 8 shows a graph of ZT as a function of both carrier concentration and temperature for various bismuth doping levels in an Mg$_2$Si compound made according to embodiments of the present invention.
Figure 9:
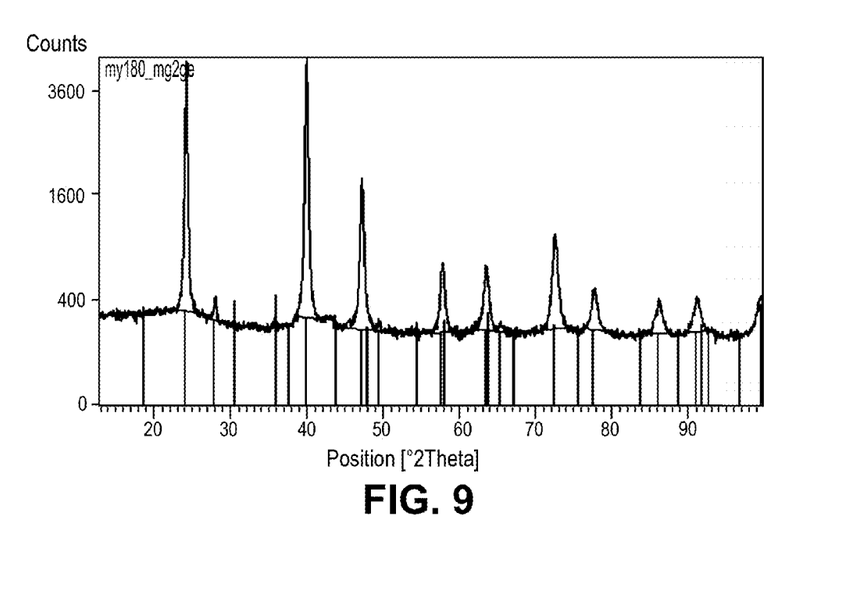
FIG. 9 shows a powder X-ray diffraction pattern for Mg$_2$Ge made according to an embodiment of the present invention.

This example provides a method according to the present invention of producing $Mg_2Ge$ by the process described in Example 1. FIG. 9 includes a powder X-ray diffraction pattern of the product.

Example 3

Production of $Mg_2Sn$

Figure 10:
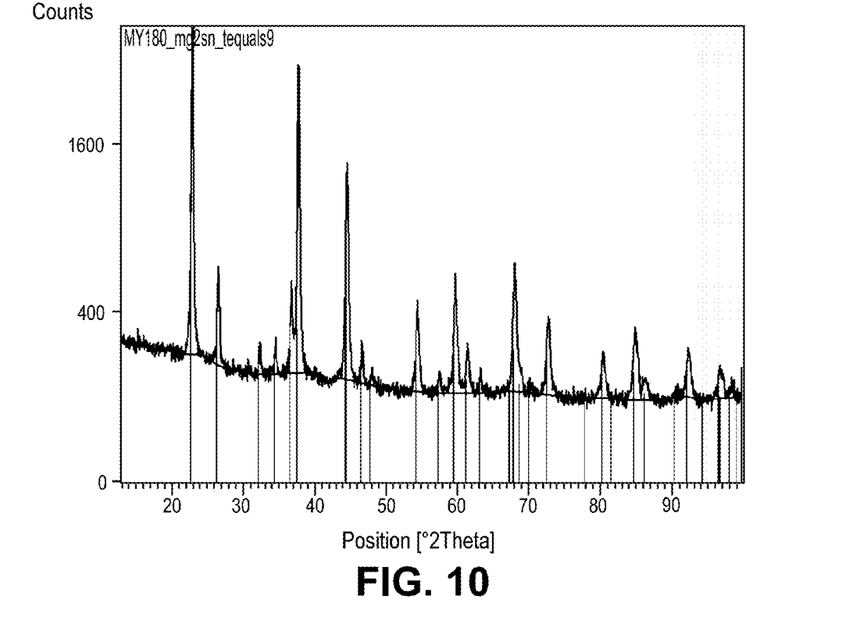
FIG. 10 shows a powder X-ray diffraction pattern for Mg$_2$Sn made according to an embodiment of the present invention.

This example provides a method according to the present invention of producing $Mg_2Sn$ by the process described in Example 1. FIG. 10 includes a powder X-ray diffraction pattern of the product.

Example 4

Production of $Mg_2Si_{1-x}Sn_x$

Figure 11:
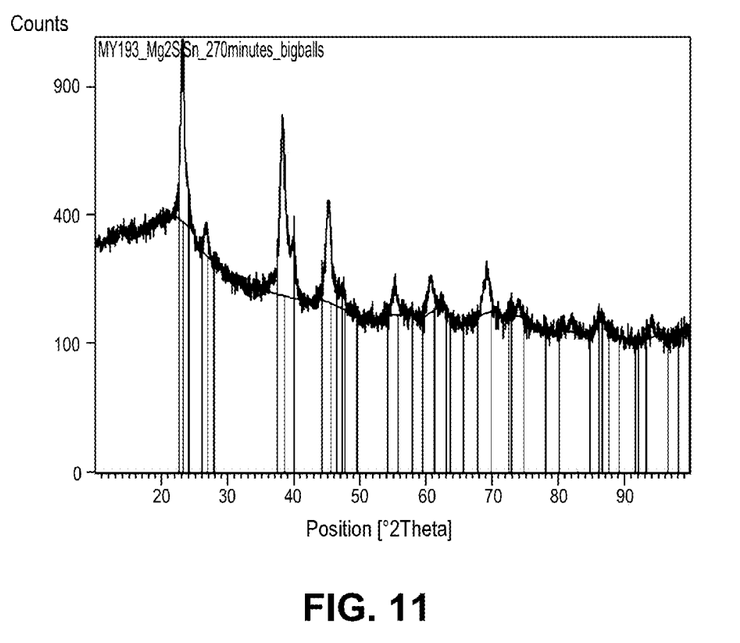
FIG. 11 shows a powder X-ray diffraction pattern for Mg$_2$Si$_{1-x}$Sn$_x$ made according to an embodiment of the present invention.

This example provides a method according to the present invention of producing $Mg_2Si_{1-x}Sn_x$ by the process described in Example 1. FIG. 11 includes a powder X-ray diffraction pattern of the product.

Example 5

Production of $CaSi_2$

Figure 12:
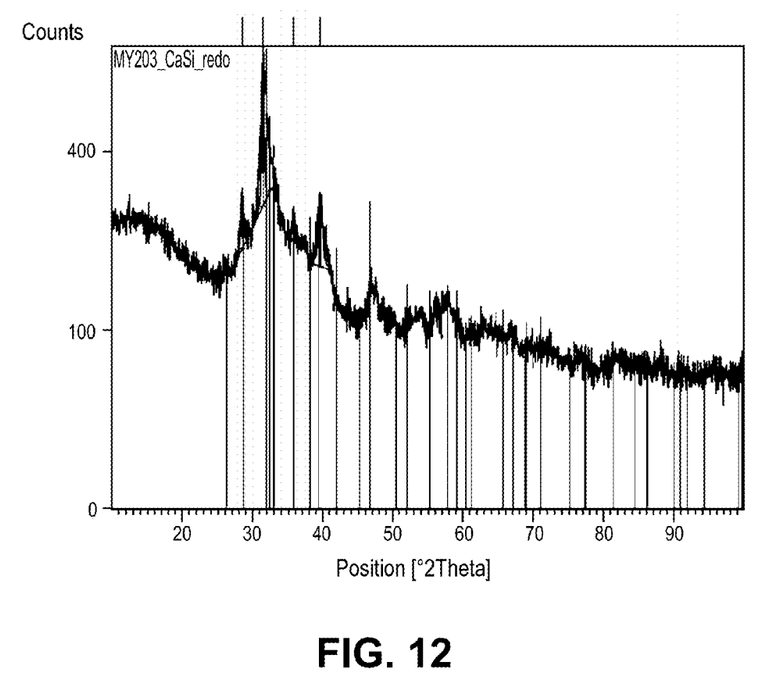
FIG. 12 shows a powder X-ray diffraction pattern for CaSi$_2$ made according to an embodiment of the present invention.

This example provides a method according to the present invention of producing $CaSi_2$ by the process contained in Example 1. FIG. 12 includes a powder X-ray diffraction pattern of the product.

Although the foregoing invention has been described in some detail by way of illustration and example for purposes of clarity of understanding, one of skill in the art will appreciate that certain changes and modifications can be practiced within the scope of the appended claims. In addition, each reference provided herein is incorporated by reference in its entirety to the same extent as if each reference was individually incorporated by reference. Where a conflict exists between the instant application and a reference provided herein, the instant application shall dominate.

What is claimed is:

1. A method of making a substantially phase pure compound of Formula I,
    wherein
        A is a cation selected from the group consisting of Na, K, Rb, Mg, Ca, Sr, and Ba, and combinations thereof, and
        X is an anion selected from the group consisting of Si, Ge, and Sn, and combinations thereof,
        wherein the compound of Formula I is charge neutral,
    the method comprising:
        mixing a stoichiometric amount of anion X and a first amount of cation A in a ball-milling device, wherein the first amount of cation A is less than a stoichiometric amount of cation A, thereby consuming substantially all of the first amount of cation A and a first portion of anion X that is less than the stoichiometric amount of anion X to form a mixture of AX and unreacted X; and
        mixing a second amount of cation A with the unreacted X and the AX in the ball-milling device, wherein the second amount of cation A is less than the stoichiometric amount of cation A, thereby consuming substantially all of the second amount of cation A and a first amount of unreacted X, to afford substantially phase pure AX.

2. The method of claim 1, wherein the method further comprises:
    mixing a third amount of cation A with any remaining X and the AX in the ball-milling device, wherein the third amount of cation A is less than the stoichiometric amount of cation A, thereby consuming substantially all of the third amount of cation A and any remaining X, to afford substantially phase pure AX.

3. The method of claim 1, wherein the substantially phase pure compound AX contains less than two percent oxide.

4. The method of claim 1, wherein the mixing occurs in a substantially anaerobic environment.

5. The method of claim 4, wherein the mixing is performed in an argon atmosphere.

6. The method of claim 1, wherein the ball-milling device is a high-energy ball-milling device.

7. The method of claim 1, wherein the compound AX is doped with a Group V element.

8. The method of claim 7, wherein the dopant is Bismuth.

9. The method of claim 7, wherein the dopant concentration in the compound AX is between about 0.001% and 1.5% atomic weight percent of the compound AX.

10. The method of claim 1, wherein the method is completed in less than about 30 hours.

11. The method of claim 1, wherein each amount of cation A is a substantially equivalent amount of cation A.

12. The method of claim 1, wherein the compound of Formula I is:

$$A_2X$$

wherein
    A is a cation selected from the group consisting of Mg, Ca, Sr, and Ba; and
    X is an anion selected from the group consisting of Si, Ge, and Sn.

13. The method of claim 12, wherein A is Mg.

14. The method of claim 12, wherein the compound is selected from the group consisting of $Mg_2Si$, $Mg_2Ge$, $Mg_2Sn$ and $Ca_2Si$.

15. The method of claim 14, wherein the compound is $Mg_2Si$.

16. The method of claim 1, wherein the compound of Formula I is:

$$A^1_2X^1_aX^2_b$$

wherein
    $A^1$ is a cation selected from the group consisting of Mg, Ca, Sr, and Ba;
    $X^1$ and $X^2$ are each independently an anion selected from the group consisting of Si, Ge, and Sn; and
    subscripts a and b are each independently from 0 to 1, such that the sum of a and b is 1.

17. The method of claim 16, wherein the compound is $Mg_2Si_{1-x}Sn_x$, wherein subscript x is from 0 to 1.

18. The method of claim 1, wherein the compound of Formula I is selected from the group consisting of:

$$A^1_xX^1_aX^2_bX^3_c$$

$$A^1_xX^1_aX^2_b$$

$$A^1_xA^2_yX^1_aX^2_bX^3_c$$

$$A^1_xA^2_yX^1_aX^2_b \text{ and}$$

$$A^1_xA^2_yX^1_a$$

wherein
    $A^1$ and $A^2$ are each a cation independently selected from the group consisting of Na, K, Rb, Mg, Ca, Sr, and Ba;
    $X^1$, $X^2$ and $X^3$ are each an anion independently selected from the group consisting of Si, Ge, and Sn;
    subscripts a, b, and c are each independently from 0 to 1, such that the sum of a, b, and c is 1; and
    subscripts x and y are each independently from 0 to 4, such that the sum of x and y is from 2 to 4.

* * * * *

UNITED STATES PATENT AND TRADEMARK OFFICE
CERTIFICATE OF CORRECTION

Page 1 of 1

PATENT NO. : 8,591,758 B2
APPLICATION NO. : 13/156033
DATED : November 26, 2013
INVENTOR(S) : Fleurial et al.

It is certified that error appears in the above-identified patent and that said Letters Patent is hereby corrected as shown below:

In the Claims:

In Claim 1, column 11, line 31, insert --AX-- to begin a new line between "Formula I," and "wherein".

Signed and Sealed this
Nineteenth Day of January, 2016

Michelle K. Lee
*Director of the United States Patent and Trademark Office*